3,600,462
OLEFIN POLYMER BLEND WITH DICARBOXYLIC
ACID OF BLOCK COPOLYMER OF α-METHYL
STYRENE AND ALIPHATIC CONJUGATED
DIOLEFIN
Thomas O. Harmon, Midland, Mich., assignor to The
Dow Chemical Company, Midland, Mich.
No Drawing. Filed Sept. 5, 1968, Ser. No. 757,796
Int. Cl. C08f 29/12, 29/36, 29/50
U.S. Cl. 260—876                                    10 Claims

ABSTRACT OF THE DISCLOSURE

A composition of matter comprising a blend of an olefin polymer such as polyethylene and a dicarboxylic acid of a block copolymer of α-methyl styrene and an aliphatic conjugated diolefin such as 1,3-butadiene has the characteristics of a cross-linked polymer. The composition of matter is prepared by blending or otherwise mixing the olefin polymer and the dicarboxylic acid block copolymer in relative proportions such that the final product has at least about 0.5 percent by weight dicarboxylic acid block copolymer. The composition of matter is useful for providing a protective coating on a substrate of metal or the like.

---

This invention relates to polymer blends. In one aspect, this invention relates to polyolefin-containing blends which can be crosslinked. In another aspect, this invention relates to polyolefin-containing coatings which can be cross-linked by the application of heat.

The inability to cross-link olefin polymers that are substantially saturated, including homopolymers such as polyethylene and copolymers such as ethylene copolymerized with another mono-unsaturated monomer, without modifying the polymer chains such that they can be cross-linked, has limited the utility of these polymer materials. This limitation of the olefin polymers is especially significant in the coating art in those situations which require the coating to have the advantages of a cross-linked polymer system. While some of the olefin polymers can be rendered cross-linkable by subjecting the polymer to controlled doses of radiation, such a treatment is time consuming and expensive. Moreover, many of the olefin polymers are not amenable to such a treatment.

According to this invention, an olefin polymer is blended or otherwise mixed with a dicarboxylic acid of a block copolymer of α-methyl styrene and an aliphatic conjugated diolefin to provide a composition of matter which is cross-linkable. The composition of matter of this invention possesses many of the properties of a cross-linked olefin polymer without the necessity of having to modify the olefin polymer to allow it to be cross-linked.

Accordingly, it is an object of this invention to provide a cross-linkable blend containing an olefin polymer.

Another object of this invention is to provide an olefin polymer-containing composition of matter which possesses many of the properties of a cross-linked olefin polymer without modifying the olefin polymer molecules.

These and other objects of the invention will become apparent to one skilled in the art after studying the following detailed description and the appended claims.

The dicarboxylic acid block copolymer which is blended or otherwise mixed with an olefin polymer to produce a composition of matter which can be cross-linked by the application of heat according to the teachings of this invention comprises a dicarboxylic acid of a block copolymer of α-methyl styrene and an aliphatic conjugated diolefin having between 4 and 6 carbon atoms per molecule. The dicarboxylic acid block copolymer is represented by the formula $$HOOC—(B)_y(A)_x(B)_y—COOH$$

wherein A represents a molecule of the α-methyl styrene after it has become a part of the polymer, $x$ is an integer of between 3 and 6, inclusive, each B represents a molecule of the aliphatic conjugated diolefin after it has become a part of the polymer, each $y$ is an integer of between 1 and about 100, and the HOOC— and —COOH portions represent carboxylic acid groups attached to the ends of the polymer. Exemplary conjugated diolefins which can be block-copolymerized with the α-methyl styrene polymer block include butadiene, isoprene, 1,3-pentadiene, dimethyl butadiene, mixtures of the foregoing diolefins, and the like. As indicated with respect to the general formula, the α-methyl styrene polymer block can be present as a trimer, tetramer, pentamer, or hexamer.

As used herein, the degree of polymerization (DP) of the dicarboxylic acid block copolymer is the number of α-methyl styrene molecules in the copolymer plus the number of conjugated diolefin molecules in the copolymer. Thus, for example, the DP of a block copolymer containing α-methyl styrene tetramer and 23 1,3-butadiene molecules on each side of the α-methyl styrene tetramer is 50. The terminal carboxylic acid groups in the block copolymer are not taken into consideration when calculating the DP for a particular block copolymer. The dicarboxylic acid block copolymers useful in practicing this invention can have any suitable degree of polymerization. In general, block copolymers having a degree of polymerization between about 5 and about 200 or more can be employed.

Although the invention is not to be bound by any particular technique for producing the dicarboxylic acid block copolymers, a suitable technique for their preparation is described in U.S. Pat. 3,346,666, the disclosure of which is specifically incorporated herein by reference. The block copolymer can be prepared by reacting α-methyl styrene with an alkali metal such as sodium at a temperature of between about −15° and about 50° C. in an aliphatic ether solvent such as methyl isopropyl ether. The reaction is allowed to proceed in an environment substantially free of impurities to form the corresponding alkali metal addition compound of the poly-(α-methyl styrene). The alkali metal compound is then reacted with an aliphatic conjugated diolefin such as 1,3-butadiene in the presence of a suitable solvent such as an aliphatic or cyclic ether at a temperature of between about −78° and −20° C. It is generally preferred that this reaction also be conducted under conditions substantially free of impurities which may react with the alkali metal addition compound or otherwise interfere with the formation of the block copolymers. The conjugated diolefin is used in amounts sufficient to provide the degree of polymerization desired. In general, the conjugated diolefin is used in an amount between about 1 and about 200 gram molecular proportions per gram equivalent proportion of the alkali metal addition compound.

The block copolymer of α-methyl styrene and conjugated diolefin thus formed is in effect a living copolymer having negatively charged end groups which react freely with carbon dioxide to form carboxylic acid groups on the ends of the polymer chains. This reaction can be effected by pouring with stirring the ether solution containing the block copolymer into a vessel containing granular solid carbon dioxide. It is generally preferred to use a stoichiometric excess of carbon dioxide.

The predominant 1,2-addition of the conjugated diolefin results in a multitude of vinyl groups pendant from the polymer chain in the vicinity of the aliphatic conjugated diolefin portion of the block copolymer. While the invention is not to be predicated upon or bound by any particular theory, it is believed that the pendant groups become entwined with the olefin polymer chains when the dicarboxylic acid block copolymer has been blended with the olefin polymer. When heat is applied to this blend, it is believed that the pendant vinyl groups cross-link and thus form a network of polymer molecules having many of the properties of a cross-linked polyolefin.

The dicarboxylic acid block copolymer is blended with the olefin polymer in an amount sufficient to produce a composition of matter having the characteristics which are desired. The actual amount of dicarboxylic acid block copolymer employed in the composition of matter will depend upon such factors as the molecular weight of the olefin polymer, the type of olefin polymer in terms of whether it is a copolymer or homopolymer, the degree of polymerization of the dicarboxylic acid block copolymer resin, and the like. While the amount dicarboxylic acid block copolymer employed does not necessarily have an upper limit except as that dictated by economics, it is generally preferred that the dicarboxylic acid block copolymer be employed in an amount equal to at least about 0.5 percent by weight based upon the total weight of the blend.

Olefin polymers which can be blended with the dicarboxylic acid block copolymer to produce a composition of matter having the characteristics of a cross-linkable or cross-linked composition of matter includes any olefin homopolymer or copolymer which will achieve the results of this invention by means of the dicarboxylic acid block copolymer. Thus, the term "olefin polymer" as used herein is intended to include any suitable olefin homopolymer such as polyethylene, polypropylene, polybutene-1, and any suitable olefin copolymer such as copolymers of ethylene and an $\alpha,\beta$-ethylenically unsaturated carboxylic acid and copolymers of ethylene, an $\alpha,\beta$-ethylenically unsaturated carboxylic acid, and an ester selected from the group consisting of alkyl esters of an $\alpha,\beta$-ethylenically unsaturated carboxylic acid and vinyl esters of a saturated carboxylic acid. Copolymers of ethylene and an ester selected from the group consisting of alkyl esters of an $\alpha,\beta$-ethylenically unsaturated carboxylic acid and vinyl esters of a saturated carboxylic acid can also be employed as the "olefin polymer" in the practice of the invention.

Exemplary $\alpha,\beta$-ethylenically unsaturated carboxylic acids which can be copolymerized with the ethylene or copolymerized with ethylene and an alkyl ester of an $\alpha,\beta$-ethylenically unsaturated carboxylic acid or vinyl ester of a saturated carboxylic acid include acrylic, methacrylic, ethacrylic, maleic, fumaric, itaconic and the like. It is generally preferred that the $\alpha,\beta$-ethylenically unsaturated carboxylic acid which is copolymerized with ethylene or with ethylene and an alkyl ester contain between about 3 and about 8 carbon atoms per molecule.

Exemplary alkyl esters of an $\alpha,\beta$-ethylenically unsaturated carboxylic acid which can be copolymerized with ethylene and an unsaturated acid or with ethylene alone include methyl methacrylate, ethyl acrylate, n-pentyl acrylate, iso-octyl acrylate, iso-propyl acrylate, n-butyl methacrylate, and the like. In the alkyl ester, it is generally preferred that the alkyl radical contain up to about 8 carbon atoms and that the acid moiety of the ester contain between 3 and 8 carbon atoms.

Exemplary vinyl esters which can be copolymerized with ethylene and an $\alpha,\beta$-ethylenically unsaturated carboxylic acid or with ethylene alone include vinyl acetate, vinyl propionate, vinyl butyrate, vinyl benzoate, and the like.

The olefin copolymers, e.g. of ethylene, can contain up to about 30 weight percent and preferably between about 5 and about 25 weight percent $\alpha,\beta$-ethylenically unsaturated carboxylic acid and up to about 30 and preferably between about 5 and about 25 weight percent of an ester selected from the group consisting of alkyl esters of $\alpha,\beta$-ethylenically unsaturated carboxylic acids and vinyl esters of saturated carboxylic acids.

Thus, olefin polymers which can be blended with the dicarboxylic acid block copolymer of this invention include homopolymers of ethylene, propylene, and 1-butene. Olefin copolymers which can be blended with the dicarboxylic acid block copolymer include copolymers of ethylene and acrylic acid. In this embodiment of the invention, it is generally preferred that the olefin polymer contain between about 70 and about 99.5 weight percent ethylene and between about 0.5 and about 30 weight percent acrylic acid. Another exemplary olefin polymer which can be blended with the dicarboxylic acid block copolymer according to this invention is a copolymer of ethylene, acrylic acid, and ethyl acrylate. In this embodiment, it is generally preferred that the olefin polymer contain between about 50 and about 90 weight percent ethylene, between about 5 and about 25 weight percent acrylic acid, and between about 5 and about 25 weight percent ethyl acrylate.

Another olefin polymer which can be blended with the dicarboxylic acid block copolymer in accordance with this invention is the copolymer of ethylene, acrylic acid and vinyl acetate. It is generally preferred that this olefin polymer contain between about 50 and about 90 weight percent ethylene, between about 5 and about 25 weight percent acrylic acid, and between about 5 and about 25 weight percent vinyl acetate.

The dicarboxylic acid block copolymer and olefin polymer can be blended or otherwise mixed together by any suitable technique such as by a roll mill or Banbury mixer. Alternatively, the olefin polymer and dicarboxylic acid block copolymer can be dissolved in a suitable solvent system which can then be flashed.

Olefin polymers which are blended with the dicarboxylic acid block copolymer in accordance with this invention to produce the desired results can generally be defined as those which have no unsaturation in the backbones of the individual polymer chains. With olefin polymers of this type, the dicarboxylic acid block copolymer is particularly effective in producing a composition of matter which can be heated to produce a polymer network having many of the properties of a highly cross-linked polymer material.

The following examples illustrate different techniques for preparing the composition of matter of this invention. It is to be understood that these examples are for the purpose of illustration only and should not be construed as limiting of the invention.

EXAMPLE I

About 50 grams of an olefin polymer comprising 72 weight percent ethylene, 14 weight percent acrylic acid, and 14 weight percent ethyl acrylate was dissolved in 500 grams of tetrahydrofuran. About 500 grams of a dicarboxylic acid block copolymer of $\alpha$-methyl styrene tetramer and 1,3-butadiene (polymerized in the 1–2 position to form pendant vinyl groups) having a DP of 50 was added to the tetrahydrofuran-olefin solution. This polymer solution was then added to 500 grams of an aqueous solution containing 5.4 grams potassium hydroxide and the tetrahydrofuran distilled off leaving a clear dispersion of the olefin polymer and dicarboxylic acid block copolymer. The resulting aqueous dispersion contained 14.6 percent solids after the tetrahydrofuran had been distilled off.

The resulting dispersion is deposited on a substrate and the water flashed off to produce a coating of the olefin-dicarboxylic acid block copolymer composition. The substrate is then heated to produce a coating which has many of the characteristics of a cross-linked olefin polymer including improved resistance to solvents and an improvement in the resistance to heat degradation.

EXAMPLE II

Polyethylene having a molecular weight of about 500,000 is blended in a Banbury mixer with a dicarboxylic acid block copolymer of α-methyl styrene tetramer and 1,3-butadiene in a relative proportion to provide a composition of matter containing 95 weight percent polyethylene and 5 weight percent dicarboxylic acid block copolymer. The resulting composition of matter is recovered from the Banbury mixer and compression molded to produce a film having a thickness of about 3 mils. The film is laminated to aluminum can stock having a thickness of about 8 mils by placing the can stock and the film between the platens of a hydraulic press which bonds the film to the aluminum under heat and pressure. The heat supplied by the platens in the hydraulic press is sufficient to cause the pendant vinyl groups of the block copolymer to cross-link with each other and thus produce a coating on the aluminum can stock which has the characteristics of a cross-linked olefin.

The composition of matter of this invention can be applied to any suitable substrate of metal or the like to form a tightly adhering protective coating. Exemplary metal substrates which can be coated with the composition of this invention include aluminum, steel, bonderized steel, magnesium, iron, and the like. Exemplary non-metallic substrates which can be coated by the composition of this invention include kraft paper, glass, plastics, and the like. The metal substrate can be in the form of automobile bodies, containers, metal strips or sheets for use in fabricating receptacles, flashing material for building construction, and the like.

Although the invention has been described in considerable detail, it must be understood that such description is for the purpose of illustration only and many variations and modifications are possible without departing from the spirit and scope of the invention.

That which is claimed is:

1. A composition of matter comprising a blend of an olefin polymer characterized by having substantially no unsaturation in the backbones of the individual polymer chains and at least about 0.5 percent by weight, based upon the total weight of said blend, of a dicarboxylic acid of a block copolymer of α-methyl styrene and an aliphatic conjugated diolefin having between 4 and 6 carbon atoms per molecule, inclusive, said block copolymer having the formula $$HOOC-(B)_y(A)_x(B)_y-COOH$$

wherein A represents a molecule of the α-methyl styrene after it has become a part of the polymer, $x$ is an integer of between 3 and 6, inclusive, each B represents a molecule of the aliphatic conjugated diolefin after it has become a part of the polymer, each $y$ is an integer of between 1 and about 100, and the HOOC— and —COOH portions represent carboxylic acid groups attached to the ends of the polymer.

2. A composition of matter according to claim 1 wherein said dicarboxylic acid block copolymer comprises α-methyl styrene tetramer and 1,3-butadiene having a degree of polymerization between about 6 and about 200.

3. A composition of matter according to claim 1 wherein said olefin polymer is selected from the group consisting of homopolymers of ethylene, propylene, and 1-butene; copolymers of ethylene containing up to about 30 weight percent α,β-ethylenically unsaturated carboxylic acid; copolymers of ethylene containing up to about 30 weight percent of an ester selected from the group consisting of alkyl esters of an α,β-ethylenically unsaturated carboxylic acid and vinyl esters of a saturated carboxylic acid; and copolymers of ethylene containing up to about 30 weight percent α,β-ethylenically unsaturated carboxylic acid and containing up to about 30 weight percent of an ester selected from the group consisting of alkyl esters of an α,β-ethylenically unsaturated carboxylic acid and vinyl esters of a saturated carboxylic acid.

4. A composition of matter according to claim 3 wherein said olefin polymer is polyethylene.

5. A composition of matter according to claim 3 wherein said olefin polymer is a copolymer of ethylene and acrylic acid.

6. A composition of matter according to claim 5 wherein said olefin polymer contains between about 70 and about 99.5 weight percent ethylene and between about 0.5 and about 30 weight percent acrylic acid.

7. A composition of matter according to claim 3 wherein said olefin polymer is a copolymer of ethylene, acrylic acid, and ethyl acrylate.

8. A composition of matter according to claim 7 wherein said olefin polymer contains between about 50 and about 90 weight percent ethylene, between about 5 and about 25 weight percent acrylic acid, and between about 5 and about 25 weight percent ethyl acrylate.

9. A composition of matter according to claim 3 wherein said olefin polymer is a copolymer of ethylene, acrylic acid, and vinyl acetate.

10. A composition of matter according to claim 9 wherein said olefin polymer contains between about 50 and about 90 weight percent ethylene, between about 5 and about 25 weight percent acrylic acid, and between about 5 and about 25 weight percent vinyl acetate.

References Cited

UNITED STATES PATENTS 3,346,666    10/1967    Dennis _____ 260—879

SAMUEL H. BLECH, Primary Examiner

U.S. Cl. X.R.

117—124, 132, 138.8, 155; 260—29.7, 30.4, 880